US010831696B2

(12) United States Patent
Arroyo et al.

(10) Patent No.: US 10,831,696 B2
(45) Date of Patent: *Nov. 10, 2020

(54) MANAGING BY A HYPERVISOR FLEXIBLE ADAPTER CONFIGURATIONS AND RESOURCES IN A COMPUTER SYSTEM

(71) Applicant: International Business Machines Corporation, Armonk, NY (US)

(72) Inventors: Jesse P. Arroyo, Rochester, MN (US); Charles S. Graham, Rochester, MN (US); Daniel J. Larson, Rochester, MN (US); Timothy J. Schimke, Stewartville, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/580,282

(22) Filed: Sep. 24, 2019

(65) Prior Publication Data

US 2020/0019527 A1 Jan. 16, 2020

Related U.S. Application Data

(63) Continuation of application No. 15/427,199, filed on Feb. 8, 2017, now Pat. No. 10,621,133.

(51) Int. Cl.
*G06F 13/00* (2006.01)
*G06F 13/42* (2006.01)
(Continued)

(52) U.S. Cl.
CPC ........ *G06F 13/4282* (2013.01); *G06F 9/5077* (2013.01); *G06F 13/4068* (2013.01); *G06F 2213/0026* (2013.01)

(58) Field of Classification Search
CPC . G06F 9/5077; G06F 13/4068; G06F 13/4282
See application file for complete search history.

(56) References Cited

U.S. PATENT DOCUMENTS 8,001,313 B2   8/2011   Eggers et al.
8,161,260 B2   4/2012   Srinivasan
(Continued)

OTHER PUBLICATIONS

BIOS Central, "BIOS Basics", bioscentral.com (online), [accessed Dec. 12, 2016], 2 Pages, URL: www.bioscentral.com/misc/biosbasics.htm.

(Continued)

*Primary Examiner* — Tammara R Peyton
(74) *Attorney, Agent, or Firm* — Peter J. Edwards

(57) ABSTRACT

Managing flexible adapter configurations in a computer system including assigning an initial amount of resources to a set of empty expansion bus slots of the computer system; detecting an adapter has been attached to one of the set of empty expansion bus slots; receiving, by a hypervisor, a request for additional resources for use by the detected adapter, wherein the additional resources are in addition to the initial amount of resources assigned to the expansion bus slot occupied by the detected adapter; determining, by the hypervisor, an availability of the additional resources for the detected adapter; in response to determining that the additional resources are available for the detected adapter, assigning, by the hypervisor at runtime, the requested additional resources to the detected adapter.

20 Claims, 6 Drawing Sheets

(51) Int. Cl.
   *G06F 13/40*   (2006.01)
   *G06F 9/50*    (2006.01)

(56) References Cited

U.S. PATENT DOCUMENTS

| | | |
|---|---|---|
| 8,473,947 B2 | 6/2013 | Goggin et al. |
| 8,645,755 B2 | 2/2014 | Brownlow et al. |
| 9,218,195 B2 | 12/2015 | Anderson et al. |
| 9,600,339 B2 | 3/2017 | Challa et al. |
| 9,716,361 B2 | 7/2017 | Huang et al. |
| 10,203,991 B2 | 2/2019 | Brady et al. |
| 10,228,962 B2 | 3/2019 | Dornemann et al. |
| 10,621,133 B2 * | 4/2020 | Arroyo ............... G06F 13/4282 |
| 2009/0037941 A1 | 2/2009 | Armstrong et al. |
| 2011/0035519 A1 | 2/2011 | Dean et al. |
| 2015/0370595 A1 * | 12/2015 | Arroyo ............... G06F 9/45558 718/1 |
| 2016/0065484 A1 | 3/2016 | Suzuki et al. |
| 2016/0124774 A1 | 5/2016 | Antony et al. |
| 2016/0147657 A1 | 5/2016 | Jiang et al. |
| 2018/0225250 A1 | 8/2018 | Arroyo et al. |

OTHER PUBLICATIONS

Intel, "Intel® Platform Innovation Framework for EFI PCI Host Bridge Resource Allocation Protocol Specification", Version 0.9, Aug. 9, 2004, intel.co.uk (online); URL: www.intel.co.uk/content/dam/doc/reference-guide/efi-pci-host-bridge-allocation-protocol-specification.pdf.
Appendix P; List of IBM Patent or Applications Treated as Related, Sep. 24, 2019, 2 pages.

* cited by examiner

MANAGING BY A HYPERVISOR FLEXIBLE ADAPTER CONFIGURATIONS AND RESOURCES IN A COMPUTER SYSTEM

CROSS-REFERENCE TO RELATED APPLICATION

This application is a continuation application of and claims priority from U.S. patent application Ser. No. 15/427,199, filed Feb. 8, 2017.

BACKGROUND

Field of the Invention

The field of the invention is data processing, or, more specifically, methods, apparatus, and products for managing flexible adapter configurations in a computer system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for managing flexible adapter configurations in a computer system are disclosed in this specification. Managing flexible adapter configurations in a computer system includes assigning an initial amount of resources to a set of empty expansion bus slots of the computer system; detecting an adapter has been attached to one of the set of empty expansion bus slots; receiving, by a hypervisor, a request for additional resources for use by the detected adapter, wherein the additional resources are in addition to the initial amount of resources assigned to the expansion bus slot occupied by the detected adapter; determining, by the hypervisor, an availability of the additional resources for the detected adapter; in response to determining that the additional resources are available for the detected adapter, assigning, by the hypervisor at runtime, the requested additional resources to the detected adapter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
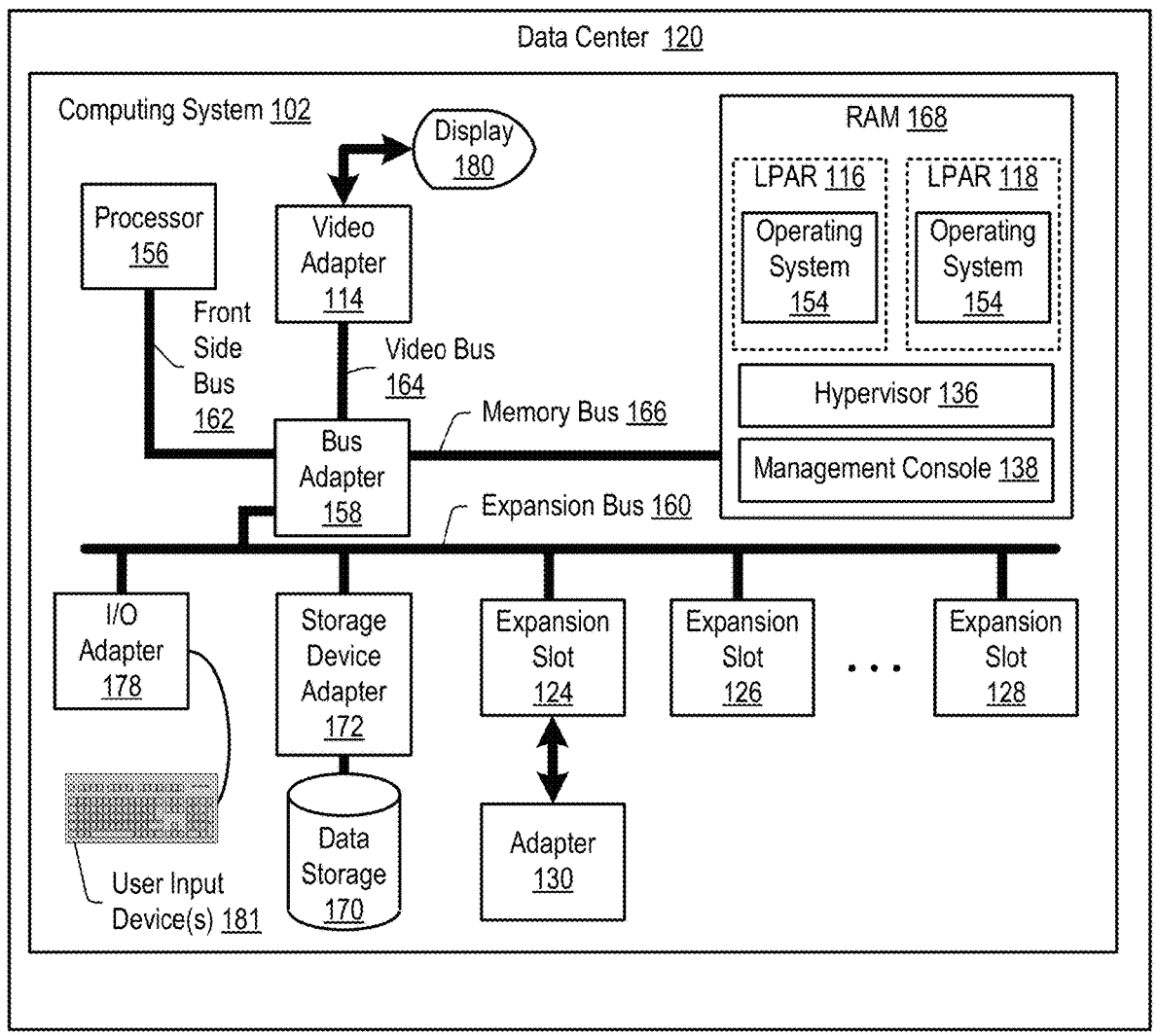
FIG. 1 sets forth a block diagram of an example system configured for managing flexible adapter configurations in a computer system according to embodiments of the present invention.

Exemplary methods, apparatus, and products for managing flexible adapter configurations in a computer system in accordance with the present invention are described with reference to the accompanying drawings, beginning with FIG. 1. FIG. 1 sets forth a network diagram of a system configured for managing flexible adapter configurations in a computer system according to embodiments of the present invention. The example environment of FIG. 1 includes a data center (120). Such a data center may provide clients on host devices (extremal to the data center (120)) with virtualization services for enabling various cloud related product offerings.

The example data center (120) of FIG. 1 includes automated computing machinery in the form of a computing system (102) configured for managing flexible adapter configurations in a computer system. The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAN (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients.

Also stored in RAM (168) are two instances of an operating system (154), one for each logical partition (116, 118). Operating systems useful in computers configured for firmware management of SR-IOV adapters according to various embodiments include UNIX™, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware (132).

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for managing flexible adapter configurations in a computer system according to various embodiments include Integrated Drive Electronics ("IDE") adapters, Small Computing system Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The expansion bus (160) shown in FIG. 1 also includes several expansion slots (124, 126, 128). The expansion slots (124, 126, 128) may be available or unoccupied adapter terminals within a communications fabric, such as a peripheral component interconnect (PCI) fabric or PCI-Express fabric. Expansion slot (124) includes adapter (130), which may be implemented as an input/output (I/O) adapter such as a network interface adapter or storage adapter. The adapter (130) may be an I/O adapter implemented as a single root input/output virtualization (SR-IOV) adapter.

SR-IOV is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition. Although referred to as a 'virtual' function, readers of skill in the art will recognize that a VF is in fact a physical channel that is not a resource virtualized entirely by the hypervisor.

As a result of multiple LPAR sharing access to a single SR-IOV adapter, each SR-IOV adapter may require a greater number of resources relative to other types of adapters. Instead of requiring that such an adapter be plugged into specific slots of the communications fabric with an appropriate amount of resources already assigned, each empty slot in the communications fabric may be assigned or have reserved an initial or minimal amount of resources. Once an adapter is plugged in, a request for additional resources for that adapter is generated and the necessary additional resources are then assigned to that adapter.

The resources assigned to and reserved for the adapters attached to the communications fabric include partitional endpoint (PE) numbers, bus/device/function (BDF) ranges, memory mapping input/output (MMIO) addresses, direct memory access (DMA) addresses, and message signal interrupt (MSI) addresses.

Figure 2:
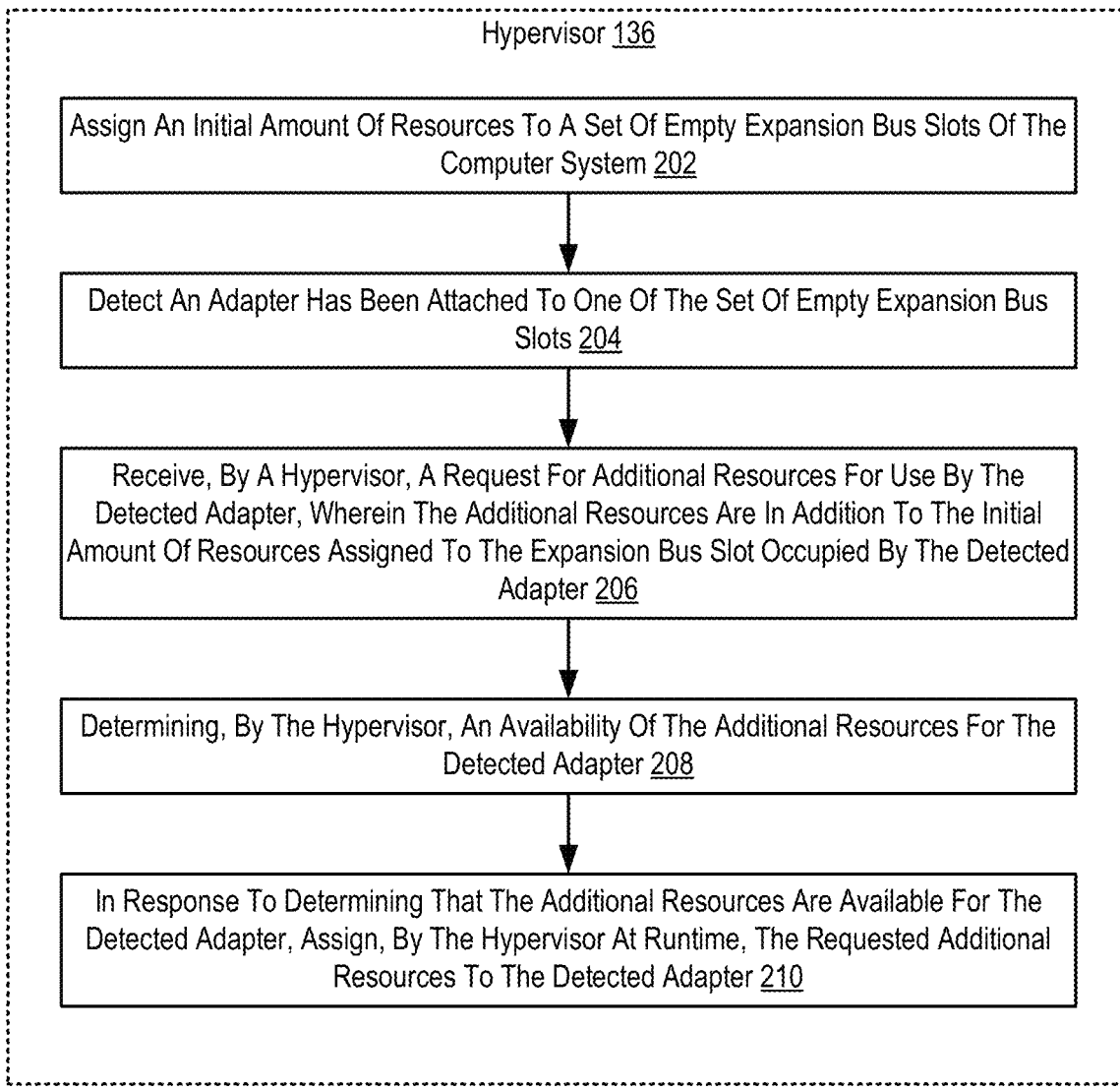
FIG. 2 sets forth a flow chart illustrating an exemplary method for managing flexible adapter configurations in a computer system according to embodiments of the present invention.

For further explanation, FIG. 2 sets forth a flow chart illustrating an exemplary method for managing flexible adapter configurations in a computer system according to embodiments of the present invention. The method of FIG. 2 includes assigning (202) an initial amount of resources to a set of empty expansion bus slots of the computer system. Assigning (202) an initial amount of resources to a set of empty expansion bus slots of the computer system may be carried out by the hypervisor or another management entity assigning or reserving a set of resources for each empty expansion bus slot or a group of empty expansion bus slots.

The same initial amount of resources may be assigned or reserved for each slot in the communications fabric. The initial amount of resources may be a minimal amount of resources, such that all or most adapters attached to the communications fabric will require at least the minimal amount of resources to function. For example, a PCIe fabric may include three empty expansion slots. Each of the three empty expansion slots may be assigned one PE number, one MMIO window, and 256 MSI addresses.

The resource allocation may be tracked by the hypervisor using slot resource array data structures. The slot resource arrays store information that maps resources and resource ranges to expansion bus slots. The hypervisor may maintain one slot resource array for each type of resource assigned to the adapters.

The resources may be assigned to the empty expansion bus slots non-contiguously. Specifically, resources may be assigned such that a set of resources may be left unassigned between the sets of resources assigned to two empty expansion bus slots. The unassigned resources may be later assigned to one of the two expansion bus slots based on the requirements of the adapter. This increases the likelihood of an adapter being assigned a contiguous range of resources. For example, MSI addresses 1-255 may be initially assigned to a first expansion bus slot, and MSI addresses 864-1119 may be initially assigned to a second expansion bus slot. MSI addresses 256-863 would therefore be available to assign at a later time to adapters in either expansion bus slot providing a contiguous range of MSI address to the adapter.

The method of FIG. 2 also includes detecting (204) an adapter has been attached to one of the set of empty expansion bus slots. Detecting (204) an adapter has been attached to one of the set of empty expansion bus slots may be carried out by the hypervisor or another management entity receiving a notification that an adapter has been plugged in to an empty slot on the expansion bus. The set of empty expansion bus slots may correspond to all or a subset of expansion bus slots on a communications fabric.

An adapter requiring a relatively large number of resources need not be attached to a specific empty expansion bus slot. An initial amount of resources is assigned to each slot of the expansion bus, and additional resources are assigned, at runtime, to the adapter as required.

The method of FIG. 2 also includes receiving (206), by a hypervisor (136), a request for additional resources for use by the detected adapter, wherein the additional resources are in addition to the initial amount of resources assigned to the expansion bus slot occupied by the detected adapter. Receiving (206), by a hypervisor (136), a request for additional resources for use by the detected adapter, wherein the additional resources are in addition to the initial amount of resources assigned to the expansion bus slot occupied by the detected adapter may be carried out by the hypervisor receiving a request from the adapter for the necessary amount of resources for the adapter to operate. The request may be received in response to detecting that the adapter has been attached to the empty slot on the expansion bus.

The method of FIG. 2 also includes determining (208), by the hypervisor (136), an availability of the additional resources for the detected adapter. Determining (208), by the hypervisor (136), an availability of the additional resources for the detected adapter may be carried out by the hypervisor comparing the requested resources to the available resources using a slot resource array. Determining (208), by the hypervisor (136), an availability of the additional resources for the detected adapter may also be carried out by comparing the requested resources to the initial amount of resources previously assigned to the expansion bus slot.

For example, determining (208), by the hypervisor (136), an availability of the additional resources for the detected adapter may be carried out by checking the number of VFs requested against the available contiguous PE number range size, checking the number of MSIs against the amount already assigned, checking the number of MSIs against the available unassigned region of MSIs, checking the number of MMIO windows against a limit for the expansion bus slot, and/or checking the number of MMIO windows against the PCI host bridge limit.

The method of FIG. 2 also includes in response to determining that the additional resources are available for the detected adapter, assigning (210), by the hypervisor (136) at runtime, the requested additional resources to the detected adapter. Assigning (210), by the hypervisor (136) at runtime, the requested additional resources to the detected adapter may be carried out by the hypervisor indicating ownership of the resources in a slot resource array. Assigning (210), by the hypervisor (136) at runtime, the requested additional resources to the detected adapter may also be carried out by returning an identifier of the assigned resources to the adapter.

Determining that the additional resources are available may include, for example, determining that the number of VFs requested are available as a contiguous PE number range, determining that the number of MSIs is less than the amount already assigned, determining that the number of MSIs are available in the unassigned region of MSIs, determining that the number of MMIO windows is within a limit for the expansion bus slot, and/or determining that the number of MMIO windows is less than or equal to the PCI host bridge limit.

"At runtime" refers to a state of execution of the programs executing on the computer system, including the hypervisor. Assigning, by the hypervisor at runtime, resources to an adapter may indicate that the resources are assigned to the adapter without restarting the hypervisor or placing the hypervisor in a suspended state. Assigning, by the hypervisor at runtime, resources to an adapter may also indicate that the resources are assigned to the adapter while the hypervisor is in a state of execution.

Figure 3:
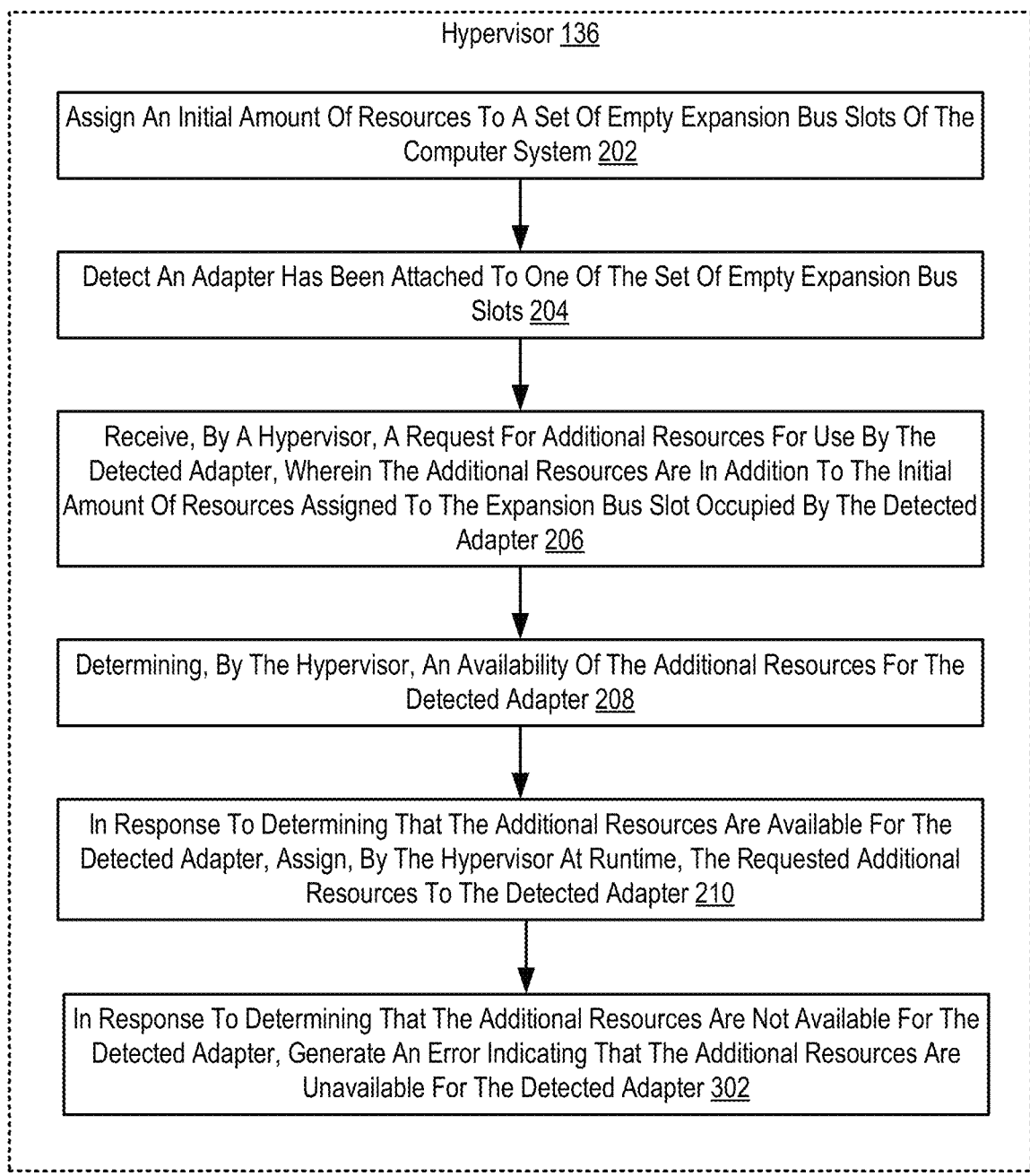
FIG. 3 sets forth a flow chart illustrating an exemplary method for managing flexible adapter configurations in a computer system according to embodiments of the present invention.

For further explanation, FIG. 3 sets forth a flow chart illustrating an exemplary method for managing flexible adapter configurations in a computer system according to embodiments of the present invention that includes assigning (202) an initial amount of resources to a set of empty expansion bus slots of the computer system; detecting (204) an adapter has been attached to one of the set of empty expansion bus slots; receiving (206), by a hypervisor (136), a request for additional resources for use by the detected adapter, wherein the additional resources are in addition to the initial amount of resources assigned to the expansion bus slot occupied by the detected adapter; determining (208), by the hypervisor (136), an availability of the additional resources for the detected adapter; in response to determining that the additional resources are available for the detected adapter, assigning (210), by the hypervisor (136) at runtime, the requested additional resources to the detected adapter.

The method of FIG. 3 differs from the method of FIG. 2, however, in that FIG. 3 further includes, in response to determining that the additional resources are not available for the detected adapter, generating (302) an error indicating that the additional resources are unavailable for the detected adapter. Generating (302) an error indicating that the additional resources are unavailable for the detected adapter may be carried out by the hypervisor or another management entity creating an error indicating that the attached adapter requires resources that are currently unavailable on the computer system. The generated error may be sent to a management console.

Determining that the additional resources are not available may include, for example, determining that the number of VFs requested are not available as a contiguous PE number range, determining that the number of MSIs is greater than the amount already assigned and determining that the number of additional MSIs are not available in the unassigned region of MSIs, determining that the number of MMIO windows is not within a limit for the expansion bus slot, and/or determining that the number of MMIO windows is greater than the PCI host bridge limit.

Figure 4:
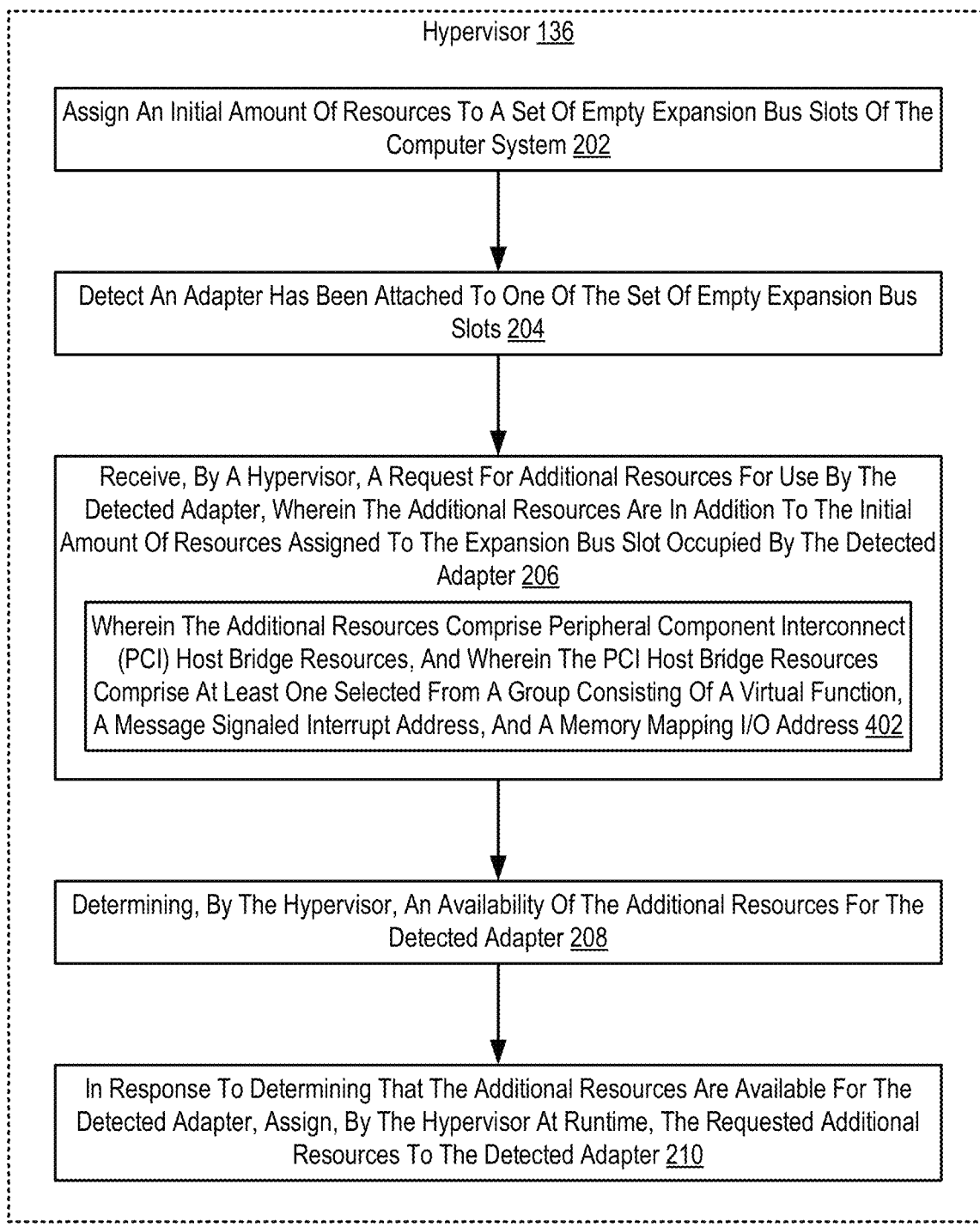
FIG. 4 sets forth a flow chart illustrating an exemplary method for managing flexible adapter configurations in a computer system according to embodiments of the present invention.

For further explanation, FIG. 4 sets forth a flow chart illustrating an exemplary method for managing flexible adapter configurations in a computer system according to embodiments of the present invention that includes assigning (202) an initial amount of resources to a set of empty expansion bus slots of the computer system; detecting (204) an adapter has been attached to one of the set of empty expansion bus slots; receiving (206), by a hypervisor (136), a request for additional resources for use by the detected adapter, wherein the additional resources are in addition to the initial amount of resources assigned to the expansion bus slot occupied by the detected adapter; determining (208), by the hypervisor (136), an availability of the additional resources for the detected adapter; in response to determining that the additional resources are available for the detected adapter, assigning (210), by the hypervisor (136) at runtime, the requested additional resources to the detected adapter.

The method of FIG. 4 differs from the method of FIG. 2, however, in that receiving (206), by a hypervisor (136), a request for additional resources for use by the detected adapter, wherein the additional resources are in addition to the initial amount of resources assigned to the expansion bus slot occupied by the detected adapter includes wherein (402) the additional resources comprise peripheral component interconnect (PCI) host bridge resources, and wherein the PCI host bridge resources comprise at least one selected from a group consisting of a virtual function, a message signaled interrupt address, and a memory mapping I/O address. The additional resources may further include a PE number, a bus/device/function (BDF) range, and direct memory access (DMA) addresses.

Figure 5:
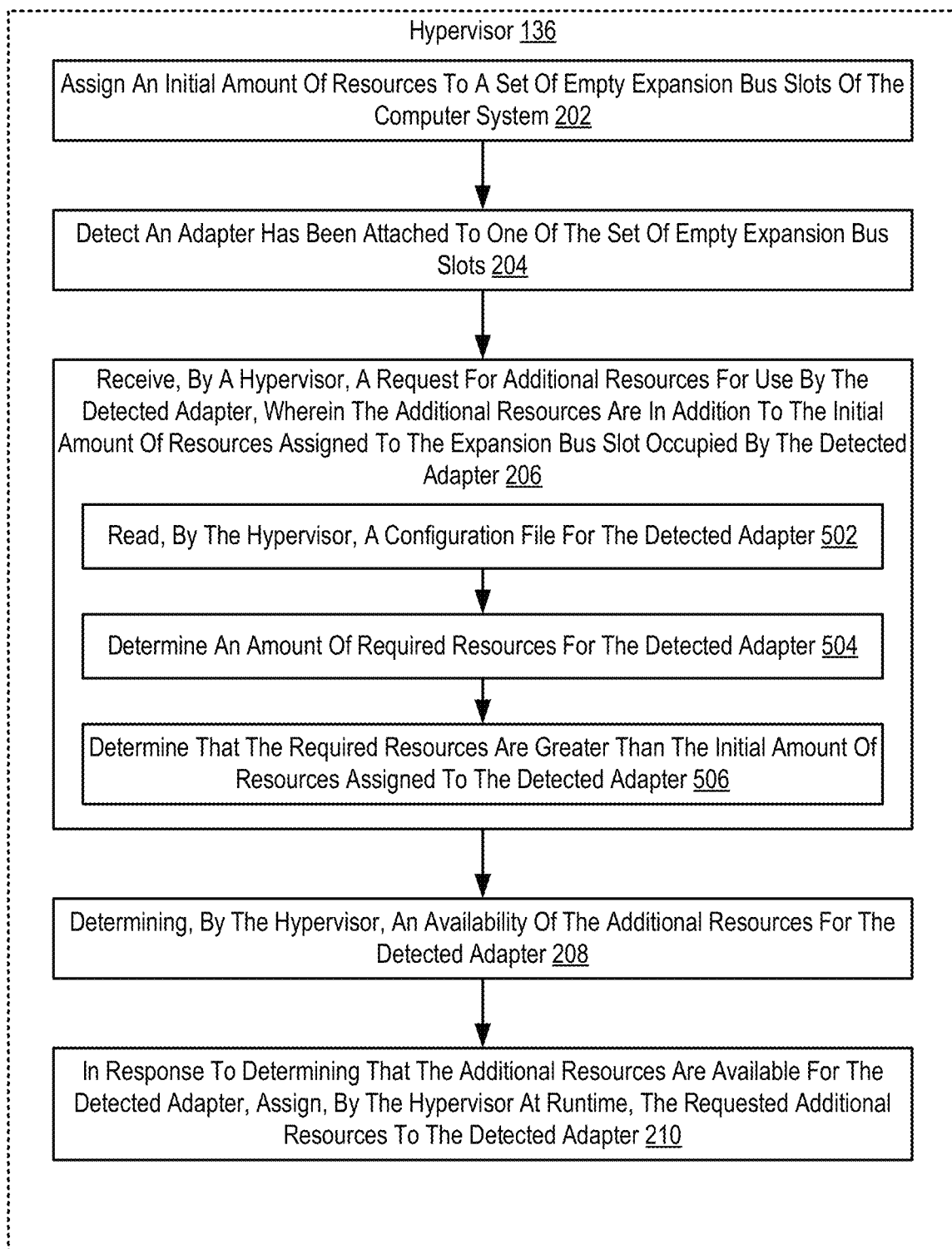
FIG. 5 sets forth a flow chart illustrating an exemplary method for managing flexible adapter configurations in a computer system according to embodiments of the present invention.

For further explanation, FIG. 5 sets forth a flow chart illustrating an exemplary method for managing flexible adapter configurations in a computer system according to embodiments of the present invention that includes assigning (202) an initial amount of resources to a set of empty expansion bus slots of the computer system; detecting (204)

an adapter has been attached to one of the set of empty expansion bus slots; receiving (206), by a hypervisor (136), a request for additional resources for use by the detected adapter, wherein the additional resources are in addition to the initial amount of resources assigned to the expansion bus slot occupied by the detected adapter; determining (208), by the hypervisor (136), an availability of the additional resources for the detected adapter; in response to determining that the additional resources are available for the detected adapter, assigning (210), by the hypervisor (136) at runtime, the requested additional resources to the detected adapter.

The method of FIG. 5 differs from the method of FIG. 2, however, in that receiving (206), by a hypervisor (136), a request for additional resources for use by the detected adapter, wherein the additional resources are in addition to the initial amount of resources assigned to the expansion bus slot occupied by the detected adapter includes reading (502), by the hypervisor, a configuration file for the detected adapter. Reading (502), by the hypervisor, a configuration file for the detected adapter may be carried out by the hypervisor accessing a storage location on the adapter that stores a configuration file. The configuration file may include information about the adapter, including the resources required for operation. Reading (502), by the hypervisor, a configuration file for the detected adapter may be performed in response to detecting (204) that the adapter has been attached to one of the set of empty expansion bus slots.

Receiving (206), by a hypervisor (136), a request for additional resources for use by the detected adapter, wherein the additional resources are in addition to the initial amount of resources assigned to the expansion bus slot occupied by the detected adapter also includes determining (504) an amount of required resources for the detected adapter. Determining (504) an amount of required resources for the detected adapter may be carried out by inspecting a configuration file stored on the adapter and locating information that includes a specification of the necessary resources required to operate the adapter.

Determining (504) an amount of required resources for the detected adapter may also be carried out by calculating the amount of required resources based on the initial amount of resources already assigned to the adapter. For example, the initial amount of resources may be subtracted from the amount of required resources for the adapter to determine the amount of additional resources to assign to the adapter.

Receiving (206), by a hypervisor (136), a request for additional resources for use by the detected adapter, wherein the additional resources are in addition to the initial amount of resources assigned to the expansion bus slot occupied by the detected adapter also includes determining (506) that the required resources are greater than the initial amount of resources assigned to the detected adapter. Determining (506) that the required resources are greater than the initial amount of resources assigned to the detected adapter may be carried out by comparing the amount of required resources to the initial amount of resources previously assigned to the expansion bus slot.

For example, an empty expansion bus slot may be initially assigned 256 MSI addresses. An adapter attached to the empty slot may include a configuration file indicating that the adapter requires, among other things, at least 864 MSI addresses. The hypervisor may then determine that 608 additional MSI address should be assigned to the adapter.

Figure 6:
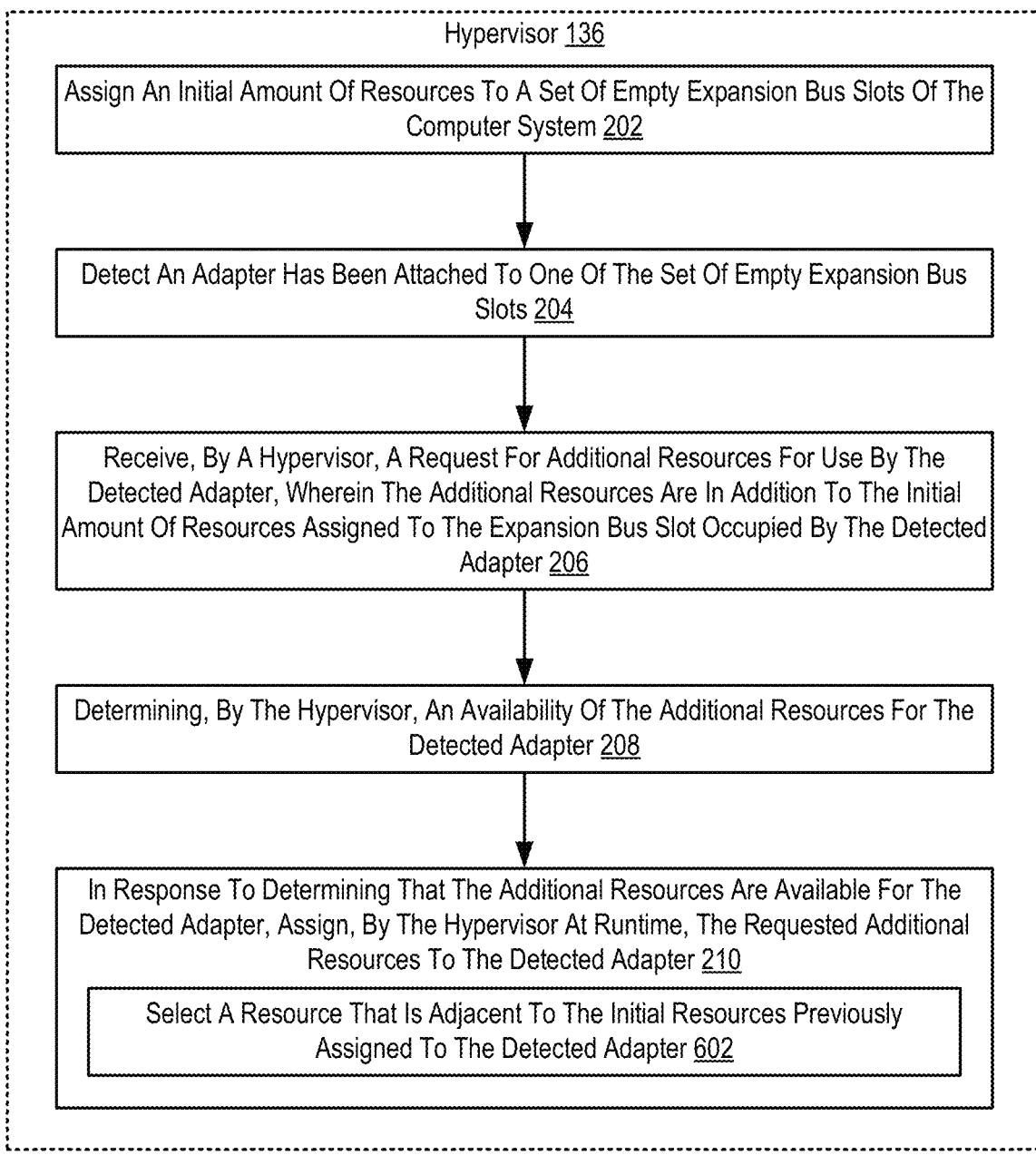
FIG. 6 sets forth a flow chart illustrating an exemplary method for managing flexible adapter configurations in a computer system according to embodiments of the present invention.

For further explanation, FIG. 6 sets forth a flow chart illustrating an exemplary method for managing flexible adapter configurations in a computer system according to embodiments of the present invention that includes assigning (202) an initial amount of resources to a set of empty expansion bus slots of the computer system; detecting (204) an adapter has been attached to one of the set of empty expansion bus slots; receiving (206), by a hypervisor (136), a request for additional resources for use by the detected adapter, wherein the additional resources are in addition to the initial amount of resources assigned to the expansion bus slot occupied by the detected adapter; determining (208), by the hypervisor (136), an availability of the additional resources for the detected adapter; in response to determining that the additional resources are available for the detected adapter, assigning (210), by the hypervisor (136) at runtime, the requested additional resources to the detected adapter.

The method of FIG. 6 differs from the method of FIG. 2, however, in that assigning (210), by the hypervisor (136) at runtime, the requested additional resources to the detected adapter includes selecting (602) a resource that is adjacent to the initial resources previously assigned to the detected adapter. Selecting (602) a resource that is adjacent to the initial resources previously assigned to the detected adapter may be carried out by inspecting a slot resource array and locating information about the initial amount of resources assigned to the adapter. Once the initial amount of resources in the slot resource array is located, a determination is made as to whether resources adjacent to (i.e., continuous with) the initial assigned resources are available.

For example, virtual function partitionable endpoint number regions may be assigned in contiguous blocks for SR-IOV adapters. The total number of virtual function partitionable endpoint numbers on the PCI host bridge may be 256, and the highest 16 numbers may be reserved for physical functions. If there are three adapter slots on a communications fabric, the remaining virtual function partitionable endpoint numbers may be divided into three contiguous segments (0-79, 80-159, and 160-239). Each empty bus slot may be initially assigned 3 virtual function partitionable endpoints from each corresponding segment. Once a SR-IOV adapter is plugged into the communications fabric, the request for additional resources may be serviced by assigning resources from the corresponding segment. Specifically, the hypervisor may assign the next adjacent numbers to the numbers already assigned to the expansion bus slot.

In view of the explanations set forth above, readers will recognize that the benefits of managing flexible adapter configurations in a computer system according to embodiments of the present invention include:

Improving the operation of a computer system by enabling system users to attach high resources use adapters to multiple expansion bus slots, increasing convenience and usability.

Improving the operation of a computer system by assigning only a minimal amount of resources to each empty expansion bus slot, increasing resource efficiency.

Improving the operation of a computer system by increasing the number of high resource use adapters able to be installed on a single system, increasing system functionality.

Improving the operation of a computer system by providing a process for post-release design change, such as adding support for new adapter types, increasing system longevity and stability.

Exemplary embodiments of the present invention are described largely in the context of a fully functional computer system for managing flexible adapter configurations in a computer system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for managing flexible adapter configurations in a computer system comprising:
    assigning an initial amount of resources to a set of empty expansion bus slots of the computer system, wherein the initial amount of resources assigned to each empty expansion bus slot includes a set of assigned resources that is contiguous with an unassigned set of resources;
    detecting an adapter has been attached to one of the set of empty expansion bus slots;
    receiving, by a hypervisor, a request for an additional amount of the resources for use by the detected adapter, wherein the additional amount of the resources are in addition to the initial amount of the resources assigned to the expansion bus slot occupied by the detected adapter;
    determining, by the hypervisor, an availability of the additional amount of the resources for the detected adapter; and
    in response to determining that the additional amount of the resources are available for the detected adapter, assigning, by the hypervisor at runtime, the requested additional amount of the resources to the detected adapter.

2. The method of claim 1, further comprising:
    in response to determining that the additional resources are not available for the detected adapter, generating an error indicating that the additional resources are unavailable for the detected adapter.

3. The method of claim 1, wherein the additional resources comprise peripheral component interconnect (PCI) host bridge resources, and wherein the PCI host bridge resources comprise at least one selected from a group consisting of a virtual function, a message signaled interrupt address, and a memory mapping I/O address.

4. The method of claim 1, wherein receiving, by the hypervisor, the request for additional resources comprises reading, by the hypervisor, a configuration file for the detected adapter.

5. The method of claim 1, wherein receiving, by the hypervisor, the request for additional resources comprises:
    determining an amount of required resources for the detected adapter;
    determining that the required resources are greater than the initial amount of resources assigned to the detected adapter.

6. The method of claim 1, wherein assigning, by the hypervisor at runtime, the requested additional resources to the detected adapter comprises:
    selecting a resource that is adjacent to the initial resources previously assigned to the detected adapter.

7. The method of claim 1, wherein the detected adapter is a single root input/output virtualization (SR-IOV) adapter.

8. An apparatus for managing flexible adapter configurations in a computer system, the apparatus comprising a computer processor, a computer memory operatively coupled to the computer processor, the computer memory having disposed within it computer program instructions that, when executed by the computer processor, cause the apparatus to carry out the steps of:
    assigning an initial amount of resources to a set of empty expansion bus slots of the computer system, wherein the initial amount of resources assigned to each empty expansion bus slot includes a set of assigned resources that is contiguous with an unassigned set of resources;
    detecting an adapter has been attached to one of the set of empty expansion bus slots;
    receiving, by a hypervisor, a request for an additional amount of the resources for use by the detected adapter, wherein the additional amount of the resources are in addition to the initial amount of the resources assigned to the expansion bus slot occupied by the detected adapter;
    determining, by the hypervisor, an availability of the additional amount of the resources for the detected adapter; and
    in response to determining that the additional amount of the resources are available for the detected adapter, assigning, by the hypervisor at runtime, the requested additional amount of the resources to the detected adapter.

9. The apparatus of claim 8, wherein the computer program instructions, when executed by the computer processor, further cause the apparatus to carry out the steps of:
    in response to determining that the additional resources are not available for the detected adapter, generating an error indicating that the additional resources are unavailable for the detected adapter.

10. The apparatus of claim 8, wherein the additional resources comprise peripheral component interconnect (PCI) host bridge resources, and wherein the PCI host bridge resources comprise at least one selected from a group consisting of a virtual function, a message signaled interrupt address, and a memory mapping I/O address.

11. The apparatus of claim 8, wherein receiving, by the hypervisor, the request for additional resources comprises reading, by the hypervisor, a configuration file for the detected adapter.

12. The apparatus of claim 8, wherein receiving, by the hypervisor, the request for additional resources comprises:
    determining an amount of required resources for the detected adapter;
    determining that the required resources are greater than the initial amount of resources assigned to the detected adapter.

13. The apparatus of claim 8, wherein assigning, by the hypervisor at runtime, the requested additional resources to the detected adapter comprises:
    selecting a resource that is adjacent to the initial resources previously assigned to the detected adapter.

14. The apparatus of claim 8, wherein the detected adapter is a single root input/output virtualization (SR-IOV) adapter.

15. A computer program product for managing flexible adapter configurations in a computer system, the computer program product disposed upon a computer readable medium, the computer program product comprising computer program instructions that, when executed, cause a computer to carry out the steps of:

assigning an initial amount of resources to a set of empty expansion bus slots of the computer system, wherein the initial amount of resources assigned to each empty expansion bus slot includes a set of assigned resources that is contiguous with an unassigned set of resources;

detecting an adapter has been attached to one of the set of empty expansion bus slots;

receiving, by a hypervisor, a request for an additional amount of the resources for use by the detected adapter, wherein the additional amount of the resources are in addition to the initial amount of the resources assigned to the expansion bus slot occupied by the detected adapter;

determining, by the hypervisor, an availability of the additional amount of the resources for the detected adapter; and in response to determining that the additional amount of the resources are available for the detected adapter, assigning, by the hypervisor at runtime, the requested additional amount of the resources to the detected adapter.

16. The computer program product of claim 15, wherein the computer program instructions, when executed, further cause a computer to carry out the steps of:

in response to determining that the additional resources are not available for the detected adapter, generating an error indicating that the additional resources are unavailable for the detected adapter.

17. The computer program product of claim 15, wherein the additional resources comprise peripheral component interconnect (PCI) host bridge resources, and wherein the PCI host bridge resources comprise at least one selected from a group consisting of a virtual function, a message signaled interrupt address, and a memory mapping I/O address.

18. The computer program product of claim 15, wherein receiving, by the hypervisor, the request for additional resources comprises reading, by the hypervisor, a configuration file for the detected adapter.

19. The computer program product of claim 15, wherein receiving, by the hypervisor, the request for additional resources comprises:

determining an amount of required resources for the detected adapter;

determining that the required resources are greater than the initial amount of resources assigned to the detected adapter.

20. The computer program product of claim 15, wherein assigning, by the hypervisor at runtime, the requested additional resources to the detected adapter comprises:

selecting a resource that is adjacent to the initial resources previously assigned to the detected adapter.

* * * * *